Jan. 20, 1942. H. M. CORLEY 2,270,649
LAWN TRIMMER
Filed May 25, 1939

Inventor
HICKMAN M. CORLEY

By
E. V. Hardway
Attorney

Patented Jan. 20, 1942

2,270,649

UNITED STATES PATENT OFFICE 2,270,649

LAWN TRIMMER

Hickman M. Corley, Houston, Tex.

Application May 25, 1939, Serial No. 275,613

3 Claims. (Cl. 97—227)

This invention relates to a lawn trimmer and has particular relation to a trimmer attachment adapted to be mounted on the handle of the ordinary lawn mower and equipped with a rotatable disc-like cutter for trimming the grass along curbs or sidewalks or for edging the sod along walks, about flower beds or in other like places.

Another object of the invention is to provide an attachment of the character described that may be readily applied to or removed from the lawn mower and is so mounted that it will be above the mower when the mower is used for ordinary mowing purposes and will not interfere with such use but upon inversion of the mower may be used for trimming or edging purposes.

It it another object of the invention to provide an attachment of the character described whereby the trimming disc may be adjusted laterally into the desired relation with the corresponding wheel of the mower and may be securely held in a plane parallel with the plane of said mower wheel so that the trimming disc will cut along a straight line which is parallel to the line of movement of the mower.

It is another object of the invention to provide, in an attachment of the character described, novel means for securing the attachment to the mower handle.

With the above and other objects in view the invention has particular relation to certain novel features of construction, operation and arrangement of parts, an example of which is given in this specification and illustrated in the accompanying drawing, wherein.

Figure 1:
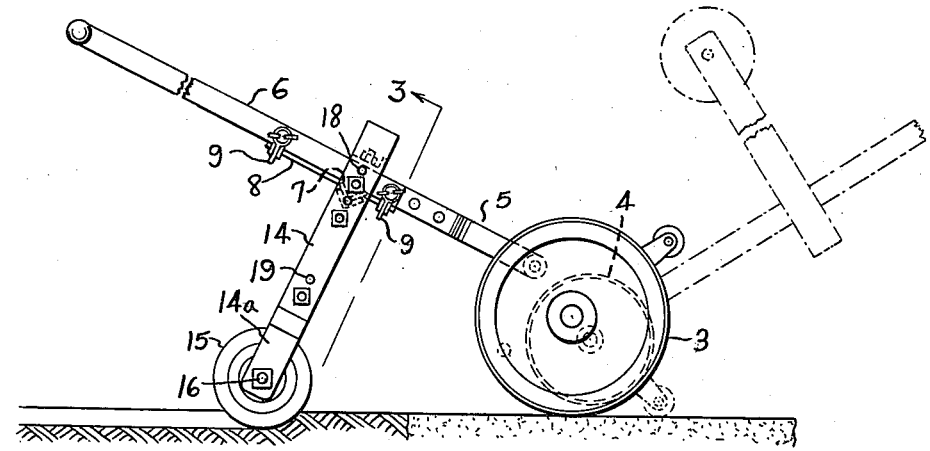
Figure 1 shows a side elevation of a lawn mower, showing the trimmer attachment applied.

Referring now more particularly to the drawing wherein like numerals of reference designate the same parts in each of the figures, the numeral 1 designates a lawn mower as a whole which may be of any conventional construction comprising the frame 2, the wheels 3, 3 arranged to drive the rotary cutter 4 as usual.

The mower also embodies the handle straps 5, 5 which are attached, at their outer ends to the frame and whose inner ends are firmly secured, as by bolting, to opposite sides of the inner end of the handle 6.

Figure 2:
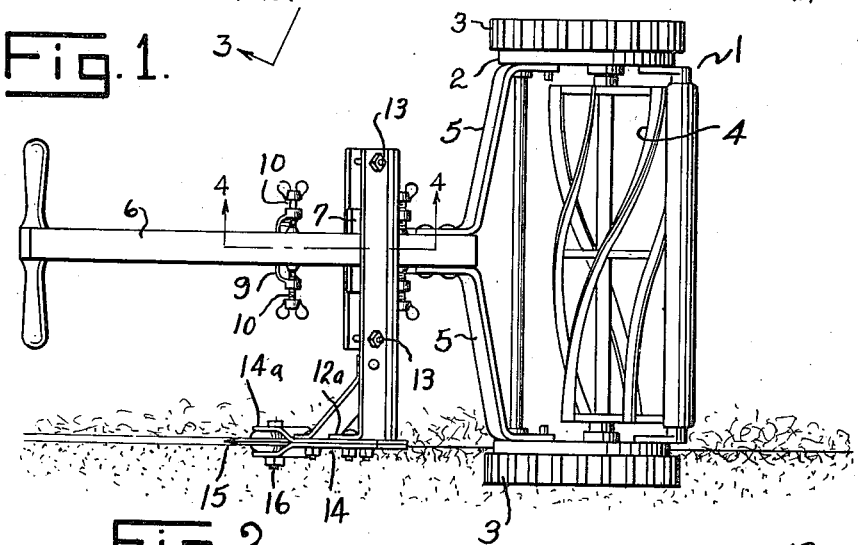
Figure 2 shows a plan view thereof.
Figure 3:
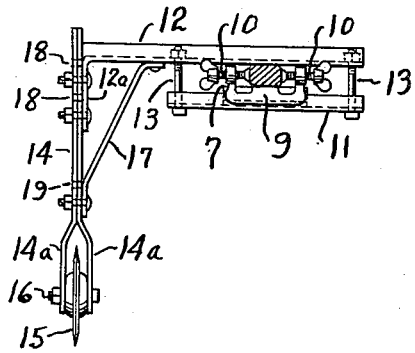
Figure 3 shows a sectional view taken on the line 3—3 of Figure 1.
Figure 4:
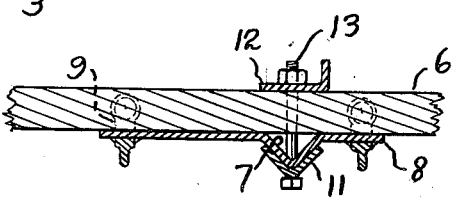
Figure 4 shows an enlarged, fragmentary, sectional view taken on the line 4—4 of Figure 2.

Underneath the handle 6, when the mower is inverted, there is a transverse guide 7 of a length considerably greater than the width of the handle as clearly shown in Figures 2 and 3. This guide is preferably formed of angle iron with its apex directed downwardly as clearly shown in Figure 4. Welded to, or formed integrally with, the guide there is a strap 8 extending each way beyond the guide and welded to the ends of the strap are the U-shaped brackets 9 whose arms embrace the handle as clearly shown in Figures 2 and 3. Clamp screws 10 are threaded through the free ends of said arms and may be screwed inwardly to securely grip the handle, as shown in Figure 3 or screwed outwardly to release the handle when it is desired to remove the attachment from the handle.

Nested with the guide 7 there is an angle iron 11 forming a clamp which extends each way beyond said guide and on the opposite side of the handle and parallel with the clamp 11 there is an angle iron 12 also forming a clamp and these clamps are held in firm gripping relation with the handle and with the guide 7 by the clamp bolts 13, 13 connecting them as shown more clearly in Figure 3.

One end of the angle iron 12 is extended out laterally, as shown in Figure 3, and is formed with the downwardly turned extension 12a. A stock 14 is bolted to said downwardly turned extension 12a and the lower end of the stock is bifurcated forming the spaced side arms 14a, 14a between which the rotatable trimmer disc 15 is mounted, said disc being mounted on the transverse spindle 16 which is supported by said side arms. The disc is formed with a sharp cutting edge. The stock 14 is braced by an angle strap 17 bolted at its upper end to the angle iron 12 and at its lower end to said stock.

It will be noted from an inspection of Figures 1 and 3 that the stock has a plurality of bolt bearings as 18, 19 providing for the vertical adjustment of the stock if desired.

By suitably adjusting the clamp screws 10 the guide 7 may be brought into exact right angular relationship with the handle 6 of the mower so that the disc 15 will run exactly parallel with the line of travel of the mower wheels. By releasing the nuts of the clamp bolts 13 the supporting frame and the disc 15 may be adjusted outwardly or inwardly to the exact location desired and said nuts then tightened to maintain the disc at the desired location.

As shown in Figures 1 and 2 the lawn mower is inverted so as to bring the trimmer disc 15 into action. When it is desired to use the lawn mower for mowing purposes it may be brought into its normal upright position. The trimming attachment will then be in the position shown in dotted lines in Figure 1 and it is not necessary to remove the same from the machine.

The drawing and description are illustrative merely, the invention not being restricted however to the precise form shown.

What I claim is:

1. A lawn trimmer attachment for lawn mowers comprising a guide, means for securing the guide to the mower handle including a strap extending longitudinally of the handle, a frame, a rotatable cutting disc on the frame, clamp means on the frame in clamping relation with the guide and handle and adjustable transversely relative to the handle, said guide and securing means being effective to prevent rotation of the frame on the handle.

2. A trimmer attachment for lawn mowers comprising a guide, adjustable means for securing the guide to the handle, in a selected relation with the handle, clamp means in clamping relation with the guide and handle, said guide and clamp means cooperating to maintain the clamp means in said selected relation with the handle, a rotatable cutting disc and means for mounting the disc on the clamp means.

3. A lawn mower attachment for lawn mowers comprising a guide, means arranged transversely of the guide for securing the guide in transverse relation to the mower handle, a clamp bearing against the guide and the handle and being adjustable transversely relative to the handle, said guide and clamp means being shaped to nest to substantially prevent rotation and transverse movement relative to the guide, a rotatable trimmer disc depending from the clamp means.

HICKMAN M. CORLEY.